United States Patent
Cottam et al.

[15] 3,638,023
[45] Jan. 25, 1972

[54] RADIOISOTOPIC POWER SOURCE

[72] Inventors: Alfred E. Cottam, Marianna; John W. H. Chi, Pittsburgh; Chang-Kyo Kim, McMurray; Robert Flaherty, Pittsburgh, all of Pa.

[73] Assignee: The United States of America as represented by the U.S. Atomic Energy Commission

[22] Filed: Nov. 7, 1969

[21] Appl. No.: 874,750

[52] U.S. Cl. ..............................250/106, 176/30, 176/39, 176/38
[51] Int. Cl. ...........................................G21h 1/00
[58] Field of Search................176/39, 30; 136/202; 250/106

[56] References Cited

UNITED STATES PATENTS

| | | | |
|---|---|---|---|
| 3,044,947 | 7/1962 | Payne, Jr. | 176/30 X |
| 2,879,216 | 3/1959 | Hurwitz, Jr. et al. | 176/43 |
| 3,329,532 | 7/1967 | Austin et al. | 176/39 X |
| 3,306,045 | 2/1967 | Buford, Jr. et al. | 176/39 X |
| 3,378,449 | 4/1968 | Roberts et al. | 176/39 X |

FOREIGN PATENTS OR APPLICATIONS 1,120,078   7/1968   Great Britain..........................176/39

Primary Examiner—Reuben Epstein
Attorney—Roland A. Anderson

[57] ABSTRACT

A power source adapted for refueling during operation including a core structure having longitudinal openings for holding radioisotopic fuel elements and longitudinal passageways for passing process fluid flow. Each fuel element opening is sealing separated from the process fluid flow passageways. The process fluid flow passageways are arranged in an even number of annular patterns or passes such that the process fluid inlet and outlet conduits are located at one end of the core. The fuel element openings are accessible at the opposite end of the core to allow fuel replacement without loss of process fluid. A fuel element shipping and transfer cask is adapted to be attached to the heat source opposite the coolant ports for replacing spent fuel elements within the core structure. A passive, self regulating, and recoverable emergency cooling system prevents core melt down on loss of coolant flow.

7 Claims, 7 Drawing Figures

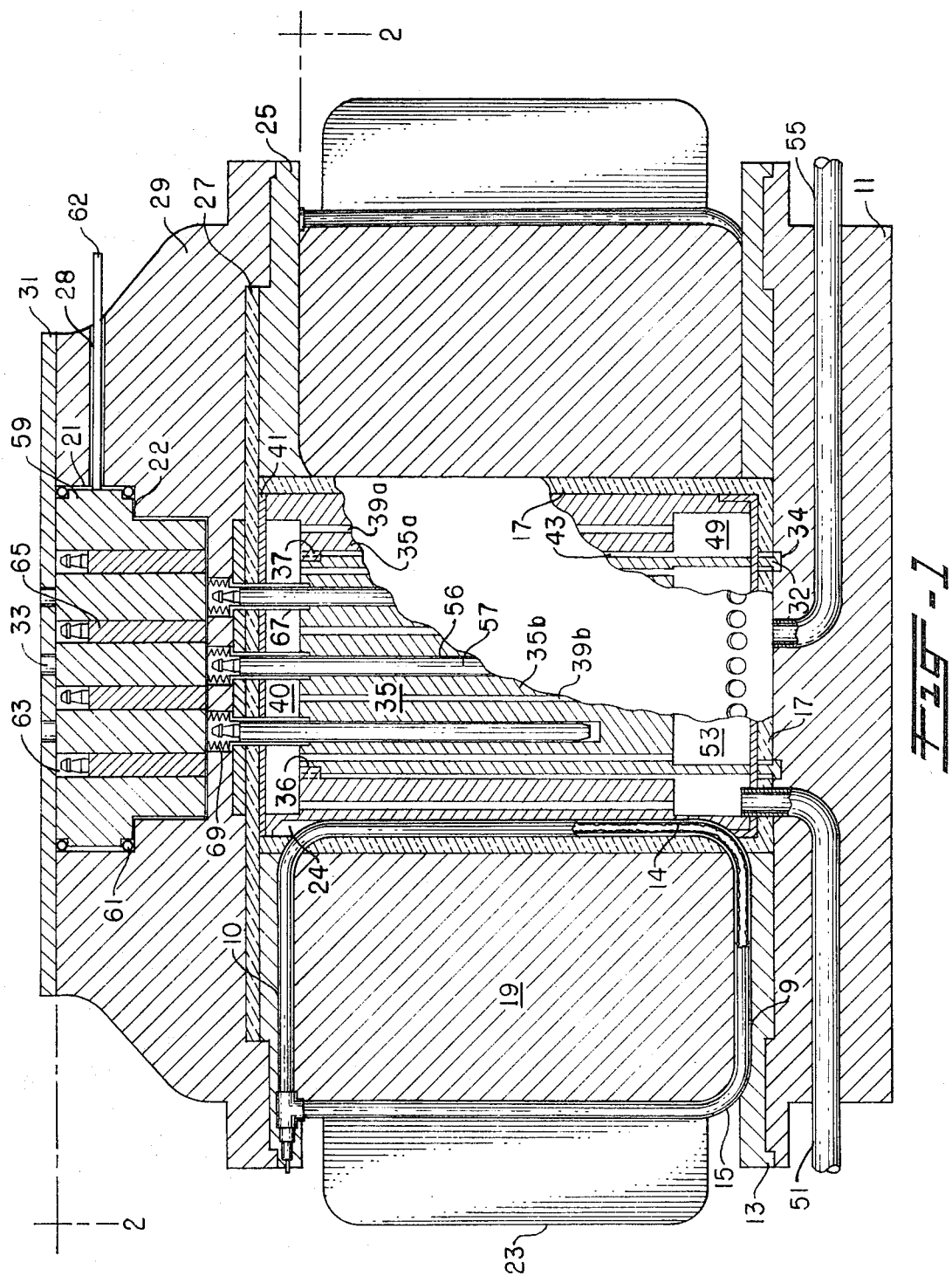

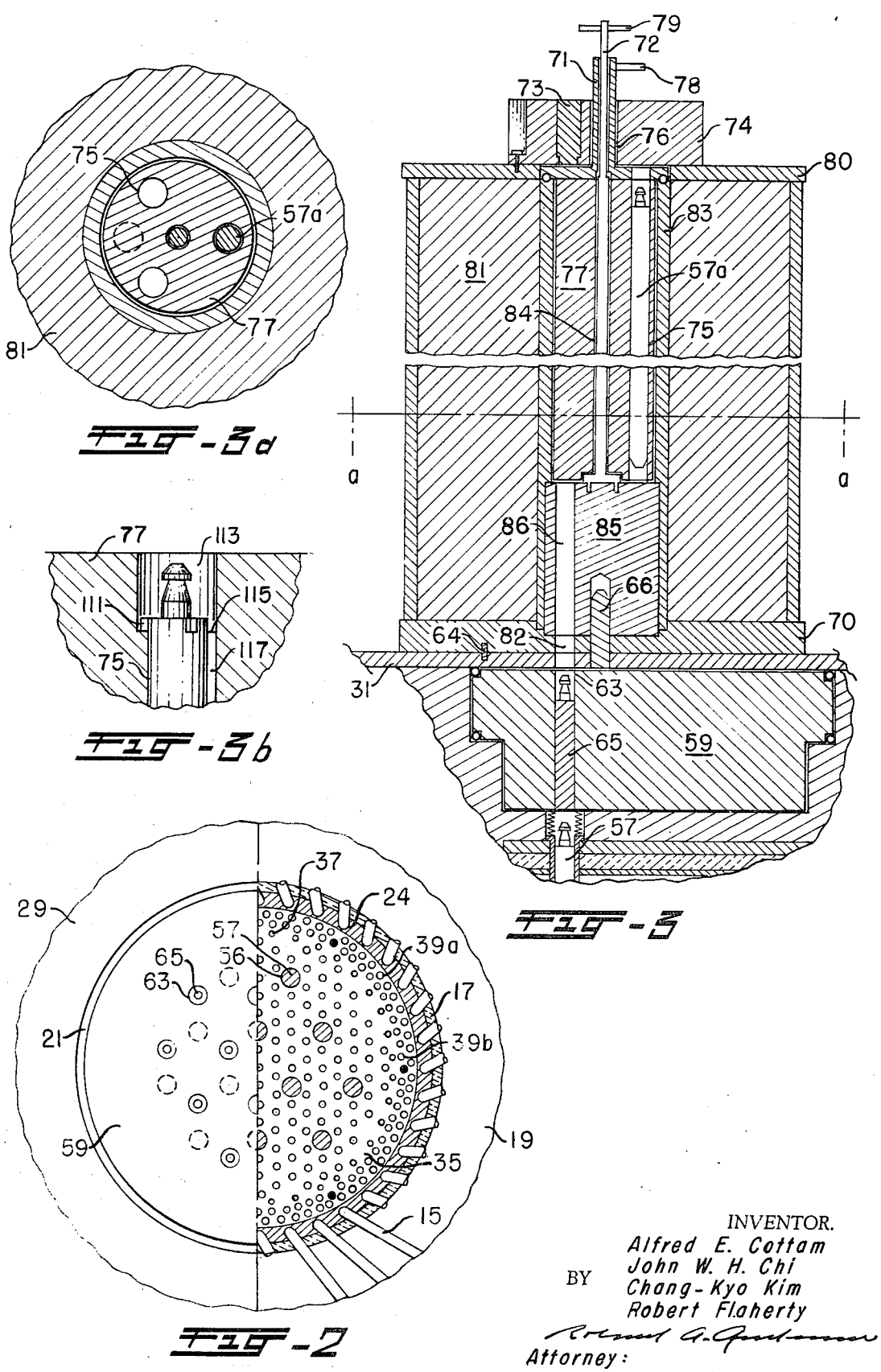

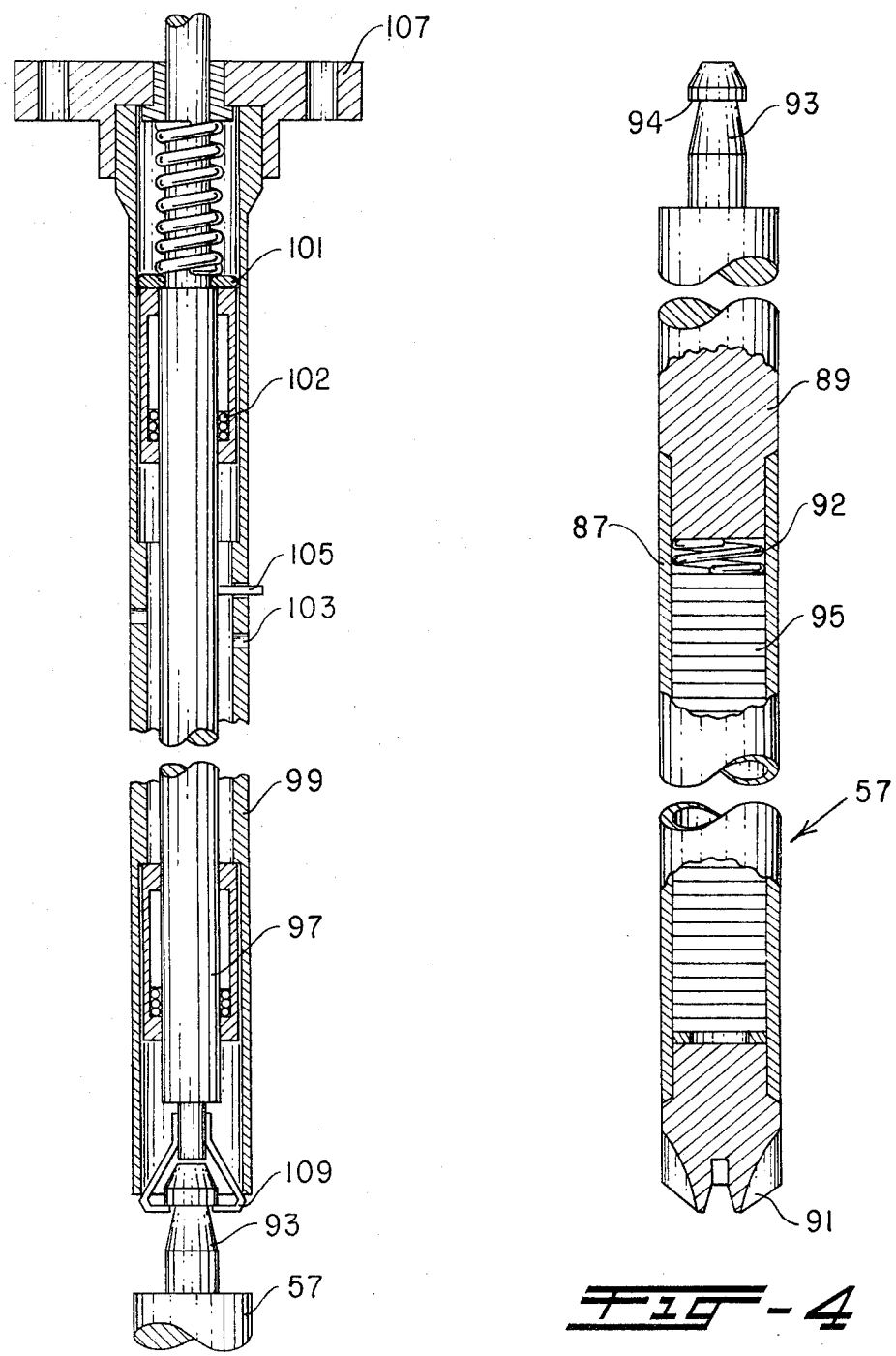

RADIOISOTOPIC POWER SOURCE

BACKGROUND OF THE INVENTION

The invention described herein was made in the course of, or under, a contract with the U.S. Atomic Energy Commission.

1. Field of the Invention

This invention relates generally to radioisotopic heat sources and more particularly to a $^{60}$Co heat source for use in remote terrestrial locations where refueling and inspection are infrequently performed.

2. Description of Prior Art

Radioisotopic heat sources are especially well suited to provide power for inaccessible terrestrial locations such as in the polar regions or under the seas. Unlike power sources utilizing fossil fuels, the radioisotopic heat source can be designed to operate long periods without refueling to minimize fuel supply problems. Furthermore, the predictable power output of a decaying radioisotope tends to simplify control problems and may eliminate the need for an attendant.

Although, nuclear reactors powered by atomic fission can also operate for long periods without refueling they generally require continuous active control to prevent loss of criticality or a nuclear incident. In addition, fuel elements within a reactor interact such that fractional fuel replacement during operation presents difficult design and control problems. Generally a reactor is originally charged with sufficient fuel to last a predetermined period and then is shut down for recharge when the fuel is depleted.

Prior radioisotopic heat or power sources have generally comprised a single fuel charge or element of sufficient radiation life to complete whatever task is required. For instance, long half life radioisotopes such as $^{238}$Pu have been used as power sources for instrumentation in weather satellites. Most often, only low power radioisotopic sources of less than about 1 kw. have been employed. One reason for this restriction is the high cost of producing suitable radioisotopes.

The copending U.S. application Ser. No. 874,749 filed Nov. 7, 1969 describes a method of increasing the useful energy obtained from a radioisotope and thereby reducing the cost of radioisotopic power. This method involves replacing a fraction of the total number of fuel elements within a power source at regular time intervals. Prior radioisotopic sources employing a single fuel charge could not readily be operated in this manner.

The power output of a radioisotope continuously decreases as the radioisotope decays. A single fuel charge must provide sufficient power at its minimum output immediately prior to replacement to perform its designed function. The power in excess of this minimum level produces redundant energy which generally must be removed to avoid overheating. The energy remaining in the radioisotope when replaced is unavailable because the power source can no longer perform its function. Consequently, a large fraction of the energy stored in a radioisotopic fuel may be wasted, if only a single fuel charge or element is employed.

Many radioisotopes such as cobalt-60 produce physiologically harmful radiation. Refueling of a source employing such a radioisotope is consequently a difficult process. Often such sources are moved to shielded rooms as "hot cells" and are handled solely by remote operators or "slaves" during the refueling process. However, it would be inconvenient or impractical to return large power sources used in remote regions for "hot cell" refueling.

SUMMARY OF THE INVENTION

It is therefore an object of the present invention to provide a radioisotopic power source capable of being employed and refueled in remote and generally inaccessible locations.

It is a further object to provide a radioisotopic power source capable of being refueled while continuing to provide power.

It is also an object to provide a radioisotopic power source capable of being operated at increased fuel economy.

In accordance with the present invention a radioisotopic heat source is provided comprising a core structure having an inner core section substantially separated from an encompassing outer core section. Both core sections include a plurality of longitudinal passageways for circulating a process fluid coolant. The inner core section is provided with a plurality of longitudinal openings for containing radioisotope fuel elements. The openings containing the fuel are sealed from the passageways having fluid flow. The fluid is admitted and discharged through port means a one end of the core structure. The opposite end of the core structure is adapted to receive a refueling means for replacing fuel elements while the heat source continues operation. A plurality of emergency cooling system conduits extend from the core structure to external cooling fins for dissipating heat on loss of process fluid coolant.

DESCRIPTION OF THE DRAWINGS

The present invention is illustrated in the accompanying drawing wherein:

FIG. 1 is an elevation view in cross section of a radioisotopic power source;

FIG. 2 is a fragmentary cross-sectional view of the central portion of FIG. 1 taken along lines 2—2;

FIG. 3 is an elevation view in cross section of a refueling cask for recharging the radioisotopic power source of FIG. 1;

FIG. 3a is an enlarged fragmentary cross-sectional view of the central portion of FIG. 3 taken along line A—A;

FIG. 3b is an enlarged fragmentary view of one method of supporting a fuel element within the refueling cask of FIG. 3;

FIG. 4 is an enlarged fragmentary view in cross section of a fuel element used in the power source of FIG. 1; and FIG. 5 is an enlarged fragmentary view in cross section of a tool for handling the fuel element in the power source of FIG. 1.

DESCRIPTION OF THE PREFERRED EMBODIMENT

Referring to FIGS. 1 and 2, a detailed description of one heat or power source embodying the present invention will now be presented. The power source is designed particularly for use with cobalt-60 fuel, but it will be clear that other gamma emitting radioisotopes may also be used. The power source structure includes an outer housing with biological shield, thermal insulation and supporting members as well as an inner structure with openings for receiving radioisotopic fuel elements and passageways for circulating process fluid.

The outer housing comprises a base structure 11 composed of suitable material for supporting and shielding the power source. A steel annulus 13 is attached to the base structure 11 and has suitably shaped radial grooves 9 for receiving the bottom section of the emergency cooling system conduits 15. The emergency cooling system will be described below. A central biological shield 19 having a toroidal shape is mounted on annulus 13 to block radiation emanating from the inner core. A hollow cylindrical vessel 17 of thermal insulation separates the sides and bottom of the inner structure from the central shield 19 to prevent heat loss. Central shield 19 and thermal insulation vessel 17 are encircled and thermally bypassed by a plurality of emergency cooling system conduits 15. Each conduit 15 forms a separate loop around shield 19 and the walls of vessel 17. A plurality of cooling fins 23 radially extend from the outside vertical portion of conduits 15 to dissipate heat when the emergency cooling system is activated.

A second annulus 25 disposed above central shield 19 has radial grooves 10 for receiving the top section of the emergency cooling system conduits 15. A top layer of thermal insulation 27 is disposed above annulus 25 for limiting heat loss. A top shield member 29 covers the top of the power source and provides a biological shield against upwardly directed radiation. A rotatable plug 59 is disposed in a large central opening 21 in top shield 29 to provide access to the inner structure of the power source. A removable adapter plate 31 covering rotatable plug 59 is provided with openings 33 aligned with the radioactive fuel in the inner structure to allow refueling.

The inner structure of the heat source includes a core member 35 divided into an outer tubular section 35a and an inner section 35b. Inner core section 35b is supported by a plurality of foot members 32 disposed in corresponding depressions 34 formed in base structure 11. Outer core section 35a is supported through an inwardly extending flange portion 36 formed in the outer core section 35a resting on a corresponding offset in inner core section 35b. An annular gap 43 separates the core sections 35a and 35b from below flange portion 36 throughout their remaining length. A plurality of apertures 37 are drilled through flange 36 to communicate with annular gap 43 and permit process fluid flow through the gap 43. Gap 43 limits heat transfer by conduction between the inner and outer core sections 35a and 35b. The operating temperature of the outer core section 35a is thereby reduced to minimize heat loss to the emergency cooling system during normal operation. Heat is transferred across gap 43 by thermal radiation and by absorption of gamma radiation in the outer core section 35a.

The outer core section 35a contains longitudinal fluid flow passageways 39a passing through the entire length of the core while the inner core section 35b contains similar passageways 39b. An upper plenum 40 at one end of core 35 interconnects the passageway 39a, apertures 37 and passageways 39b within the inner and outer core sections. Upper plenum 40 is formed by a recess in the top surface of core 35 and is covered and sealed by plate 41.

An outer lower plenum 49 communicates with passageways 39a in the outer core section and annular gap 43 between the inner and outer core sections to admit process fluid entering through inlet port 51. An inner lower plenum 53 communicates with inner core passageways 39b to discharge hot process fluid into outlet port 55. Ports 51 and 55 with their associated plenums are preferably located at one end of the core structure as shown to leave the other end open for the refueling operation.

A process fluid such as nitrogen gas enters through inlet port 51 into outer lower plenum 49. Heating begins as the fluid flows upward through outer passageways 39a and gap 43 into upper plenum 40. The fluid is heated further as it returns through inner passageways 39b into inner lower plenum 53. Heat loss is limited by arranging the cooler inlet fluid flow in the outer core section 35a around the hotter fluid flow in the inner core section 35b. The heated process fluid discharged from outlet port 55 is finally allowed to flow to a power conversion or utilization means such as a steam plant or gas turbine (not shown).

Longitudinal openings 56 are drilled part way through inner core 35b to receive radioisotope fuel elements 57 for heating the process fluid. Openings 56 are sealingly separated from the passageways 39a and 39b containing the process fluid flow. Twelve radioisotope elements are shown in FIG. 2 arranged in a diamond pattern at 120° spacing about the center of any group of three units. However, it will be clear that arrangements differing in number and pattern may also be used.

Tubular members 67 (FIG. 1) sealingly penetrate through plate 41 and are sealed into the fuel element openings 56 in the inner core 35b. The radioisotope fuel elements 57 are thereby sealed from the upper plenum 40 and may be removed without loss of process fluid. A bellows seal 69 abutting a flanged end of tubular member 67 prevents leakage around the tubular member 67.

Although the process fluid does not contact the radioisotope fuel elements 57, the heat produced by a gamma emitting radioisotope such as cobalt–60 can be readily transferred to the fluid. Heat energy is produced as the gamma radiation is absorbed in the inner and outer core sections 35a and 35b. The process fluid flowing through passageways 39a and 39b, as well as gap 43, removes heat produced in nearby portions of the core 35. It is therefore unnecessary for all of the heat produced by the fuel elements 57 to be conducted through the core material to the process fluid passageways 39a and 39b. The diameter or thickness of both the inner and outer core sections 39a and 39b can be specified by one skilled in the art to suitably distribute the gamma absorption and resultant heat production between the two core sections. Gap 43 prevents excessive conduction of heat between the two core sections without interfering with gamma radiation entering the outer core section. The outer core section can thereby be maintained at a substantially lower temperature than the inner core section to limit heat loss.

The rotatable plug 59, having a top portion of greater diameter than its lower portion is supported in the center of top shield 29 by a corresponding opening 21 and offset 22. Suitable bearings 61 at the periphery of the rotary plug 59 facilitate rotation of the plug within the top shield 29. Plug 59 is provided with a plurality of openings 63 each having a removably disposed plug 65 arranged in a diamond pattern corresponding to the pattern formed by fuel elements 57. During operation rotatable plug 59 is positioned with removable plugs 65 out of alignment with fuel elements 57, as shown, to prevent radiation streaming around the periphery of openings 63. Lever 62 is attached to rotatable plug 59 and extends outside top shield 29 through a slot 28. Slot 28 is of sufficient width or angle to allow horizontal rotation of lever 62 and rotatable plug 59 between a position in which openings 63 are precisely aligned with fuel elements 57 and a position in which openings 63 are farthermost removed from alignment with fuel elements 57. Rotation through an angle of about 60° is required for the fuel element pattern shown in FIG. 2. Suitable stops (not shown) can be provided with lever 62 to precisely define the aligned and nonaligned positions.

Each emergency cooling system conduit 15 is shown formed into a closed loop encircling central shield 19 and the sidewalls of thermal insulation vessel 17. Conduits 15 are shown disposed in longitudinal channels 24 formed in the outer surface of core 35. The conduits contain a suitable liquid, such as molten sodium, and a suitable wicking material 14 within the bottom and side loop portions. The liquid is absorbed in the wicking material 14 and is thereby conducted throughout the internal conduit portion adjacent to core 35. Excess heat is transferred from the core 35 to vaporize the liquid absorbed in the wicking material. The vapor produced flows to the external portion of the conduit and condenses due to the cooling effect of fins 23. The condensate is again absorbed in the wicking material and conducted to the internal portion of the emergency cooling conduit for reevaporation.

The heat transfer rate through the emergency cooling system is limited by the sonic velocity of the vapor at the system temperature. The system is designed such that all of the heat output of the radioisotope fuel can be transferred to the cooling fins at an elevated but safe temperature while the heat transferred or loss at a normal operating temperature is low. For instance at about 600° C. in the evaporator portion of the emergency cooling system about 3,000 watts/cm.$^2$ can be removed by sodium vapor at sonic velocity but at an ordinary operating temperature of about 425° C. a maximum of only about 150 watts/cm.$^2$ will be loss. Therefore with a maximum power loss of about 5 percent at a normal operating temperature a suitably sized emergency cooling system can remove 100 percent of the energy produced by the heat source when the temperature reaches 600° C. By way of example about 36 1¼ cm. heat pipes each of about 1½ meters loop length would be suitable for use in a 30 kw. thermal power source.

Although a continuous closed loop emergency cooling system conduit is shown, other configurations can also be used. It is required that a conduit portion be disposed adjacent to the core 35 to evaporate the contained liquid and that a connected conduit portion be disposed adjacent the cooling fins to condense the vapor. The wicking material will return the condensate to the evaporator portion against gravity if required. For example, a U-shaped or a Z-shaped emergency cooling system conduit can be adopted for use in the described power source. These open loop systems may be preferred in some instances to facilitate assembly of the central biological shield 19.

Another modification to the emergency cooling system involves providing an overpressure of inert, noncondensible gas within the system conduits. A reservoir for the inert gas can be connected at a suitable location in the emergency cooling system conduits. At the normal operating temperatures the inert gas substantially fills the condenser portion of the conduits. When an excessive temperature is reached, the inert gas is forced into the reservoir to expose the condenser portion of the conduit to the condensable vapors. The addition of the inert gas overpressure lowers the minimum allowable temperature difference between the normal operating temperature and the temperature at which the emergency cooling system can remove all of the heat produced in the power source.

Referring now to FIGS. 3 and 3a, a transport and refueling cask is shown mounted on adapter plate 31 of the power source of FIG. 1. The cask is centered coaxially over a group of three radioisotope elements 57 within the power source (shown in FIGS. 1 and 2). Removable pins 64 and 66 engage the appropriate sockets in the refueling cask bottom and the adapter plate 31 to insure proper alignment. Any group of three elements may be made accessible by shifting the cask about on the adapter plate with appropriate alignment pins in place.

The refueling cask includes an external steel housing 80 to protect against impact and a lead or other suitable biological shield 81 having sufficient thickness to block radiation from the enclosed radioisotopes. The shield 81 also has sufficient diameter to completely overlay rotatable plug 59 regardless of which group of three radioisotope elements are being serviced. Thus, when the rotatable plug openings 63 are aligned with the fuel elements 57, in the power source no radiation hazard is produced. A tubular structural member 83 lines the inside of the biological shield 81 and is supported by the base 70 of housing 80.

A containment drum 77 is rotatably supported and includes three circumferentially spaced compartments 75 each suitable for holding a fuel element 57a as shown in one compartment of FIGS. 3 and 3a. Compartments 75 are coaxially arranged in the refueling cask in an identical pattern to any three fuel elements disposed within the power source core. As an alternative, a containment drum having a single compartment can be provided. However, a separate refueling cask would be required both for removing a spent fuel element and for inserting a new fuel element into the core.

A block of shielding material 74 is fixedly supported on housing 80 above the containment drum 77 to block radiation streaming between fuel elements 57a and the wall of compartment 75. A substantial amount of shielding material is also provided in the top portion of the fuel elements as will be later described. Block 74 has three removable top plugs 73 normally in alignment with three fuel elements in the heat source core 35 (FIG. 1) when the refueling cask is mounted on the heat source for use. During shipment the fuel elements in the containment drum 77 are locked at a position out of alignment with top plugs 73 in block 74.

A central hollow shaft 71 passes through a central opening 76 in shielding block 74 and is attached to containment drum 77. A suitable handle 78 is provided on shaft 71 for rotating the shaft and the containment drum 77. A second shaft 72 with exposed handle 79 is concentrically disposed within shaft 71 and extends longitudinally through an axial opening 84 in the containment drum 77 to engage a rotatable exit drum 85 located beneath the containment drum. Extensions (not shown) can be provided for attaching to the handles 78 and 79 on shafts 71 and 72 to permit rotation without exposing personnel to the openings in the top of the refueling cask. Exit drum 85 has one longitudinal port 86 alignable with the compartments 75 in the containment drum 77 and openings 63 in the rotatable lug 59. Three or more openings 82 are provided in the bottom plate 70 of housing 80 corresponding to the fuel element alignment in the power source core. Normally port 86 in exit drum 85 is locked out of alignment with any fuel element in the refueling cask to utilize the solid mass of drum 85 as a radiation shield. Suitable locks (not shown) can be provided on shafts 71 and 72 at or around their handles 78 and 79 to maintain the drums in any desired position with respect to each other or other components of the assembly.

One method of supporting the fuel elements 57a above the top surface of the exit drum 85 is shown in FIG. 3b. Several protrusions or tabs 111 radially extend from the top portion of the fuel elements. An oversized opening 113 is provided in the top portion of compartments 75 to allow the tabs to be lowered to and supported on a constriction 115 in the diameter of compartments 75. Grooves 117 can be provided in the remaining lower portion of compartments 75, port 86, and openings 63 for receiving the tabs when transferring the fuel element to the power source core. A similar arrangement can be provided for supporting the fuel elements 57 within the power source core 35 or plugs 65 within opening 63 of the rotatable plug 59.

An enlarged view of the radioisotope fuel element 57 is shown in FIG. 4. An elongated tubular member 87 is enclosed at one end by a suitable shield plug 89 and at the opposite end with cap 91. Plug 89 can be a sufficiently long solid cylinder of a biological shielding material to diminish upwardly directed radiation. The shielding effect of plug 89 is especially required during refueling when the openings in the power source and refueling cask are aligned with the fuel elements 57. A knob 93 with a suitable lip or flange 94 extends from plug 89 for attaching and lifting the fuel element. Cobalt–60 or other gamma emitting radioisotope wafers 95 are stacked within tubular member 87. Handling of the radioisotope may be facilitated if the wafers are previously encapsulated in intermediate size capsules (not shown) before filling the fuel element. A coil spring 92 disposed at one end of the fuel element maintains the wafers or capsules in a compact stack. The number of wafers 95 employed and the cobalt–60 concentration in each wafer may be varied to provide a suitable power output for each radioisotope element 57. Blank or inert wafers can be used to space the radioactive wafers over the usable length of the fuel element.

Turning now to FIG. 5, a tool is shown for lowering the radioisotope elements 57 from the refueling cask into the heat source core 35. An elongated shaft 97 is concentrically disposed in a tube 99 and separated from the tube walls by suitable thrust bearings 101 and rotary bearings 102. Tube 99 is cut with a helical spiral 103 around its top portion well above the level lowered into the refueling cask during fuel replacement. A pin 105 is affixed to shaft 97 and engages spiral 103 to cause shaft 97 to move longitudinally when rotated in relation to tube 99. Tube 99 is fixed into mounting flange 107 at one end to allow attachment of a remotely controlled power drive (not shown) to rotate shaft 97. Means can also be provided to allow the entire tool assembly to rotate without longitudinal movement of shaft 97 as would be required for the fuel element support method of FIG. 3b. Other means are provided for lowering the tool into the refueling cask and power source. The end of shaft 97 opposite flange 107 is provided with a pivoted grapple head 109 having a spring bias towards an open or flared position. Grapple head 109 is shown retracted into tube 99 and compressed about knob 93 on the fuel element 57. The fuel element can be released by extending the spring biased grapple head 109 beyond the end of tube 99.

In one manner of operating the above-described power source, an initial radioisotope fuel element charge is installed within the openings 56 in the power source core 35. The fuel elements 57 are initially prepared with a power output gradient between the several elements. After a preselected period of radioactive decay the least powerful fuel element or elements are replaced with fuel elements having the original most powerful output. This method of fuel replacement has the advantages of providing a power source with a relatively constant power output and increased fuel economy. This method is more completely defined in the copending U.S. application Ser. No. 874,749 filed on Nov. 7, 1969.

When replacing the radioisotope fuel elements 57 in the presently described power source, the refueling cask is mounted on adapter plate 31 in coaxial alignment with a group of three fuel elements 57 within the heat source core 35. Top plugs 73 are removed and the handling tool shown in FIG. 5 is aligned with the appropriate opening in block 74. Rotatable plug 59 is rotated until removable plugs 65 and openings 63 are in alignment with fuel elements 57. An empty port 75 in the containment drum is aligned with gate drum port 86 and a spent fuel element 57 within the heat source core. Plug 63 is removed and the spent fuel element raised into compartment 75 with the remotely operated handling tool shown in FIG. 5. The containment drum 77 is then rotated to position a new fuel element above the empty opening 56 in the core 35. The new fuel element is lowered into the opening 56 in core 35 and plug 65 replaced in the rotatable plug 59. Rotatable plug 59 is returned to its normal position with openings 63 and plugs 65 out of alignment with fuel elements 57. Containment drum 77 is then rotated to position compartments 75 and the spent fuel element out of alignment with the openings in the exit drum 85 and shielding block 74. The top plugs 73 are replaced and the refueling cask removed from the heat source for return to the fuel reprocessing facility. A similar method can be used to redistribute the fuel elements to balance the temperature throughout the core.

The described heat source is capable of being employed in inaccessible locations as it has few controls, requires infrequent refueling and has a passive emergency cooling system which is activated by the overheating of the power source. The power source can be refueled while operating without loss of coolant or abrupt changes in operating manner. Furthermore the refueling may be accomplished in the field without creating a radiation hazard. A fraction of the fuel elements may be replaced periodically, such as yearly, to provide a relatively constant power output along with improved fuel economy from the power source.

What is claimed is:

1. A radioisotope power source adapted to be refueled during operation comprising:
   a. a core structure having passageways for process fluid flow through said core structure and having openings sealingly separated from said passageways,
   b. radioisotope fuel elements disposed in said openings,
   c. a layer of thermal insulation substantially surrounding said core structure,
   d. emergency cooling means for transferring substantially all the heat generated by said radioisotope fuel elements within said core structure to outside said layer of thermal insulation only when a temperature substantially exceeding the normal operating temperature of said core structure is reached; and
   e. detachable refueling means alignable with said openings in said core structure for replacing said radioisotope fuel elements.

2. The power source of claim 1 wherein said core structure includes:
   a. An inner core section having longitudinal passageways extending therethrough and having openings for said radioisotope fuel elements,
   b. an outer tubular core section coaxially disposed about said inner core section and separated therefrom for a substantial portion of the core length, said outer core section having longitudinal passageways extending therethrough,
   c. port means at one end of said core structure for admitting process fluid into said outer core section passageways and for discharging heated process fluid from said inner core section passageways, and
   d. plenum means disposed at the opposite end of said core structure from said port means for interconnecting said outer and inner core passageways.

3. The power source of claim 2 wherein said detachable refueling means is removably disposed at the end of said core structure opposite said port means, said refueling means comprising a rotatable drum having at least one longitudinal compartment for containing a radioisotope fuel element, said compartment being alignable with said openings in said core structure, and means for transferring said fuel elements between said core openings and said drum compartment.

4. The power source of claim 1 wherein said emergency cooling means includes a conduit having a first section disposed adjacent to said core structure, and a second section communicating with said first section and extending outside said layer of thermal insulation, said first section containing a wicking material communicating with a volatilizable liquid contained with said conduit.

5. The power source of claim 1 wherein there is included biological shielding means surrounding said core structure having a central opening over said core structure, a rotatable plug disposed in said central opening, said rotatable plug having a plurality of axially parallel openings arranged in a pattern corresponding to said fuel elements disposed in said core structure, said rotatable plug openings being positionable in and out of alignment with said fuel elements.

6. The power source of claim 1 wherein said radioisotope fuel element includes a plurality of wafer members, said wafer members containing a gamma emitting radioisotope.

7. The power source of claim 6 wherein said gamma emitting radioisotope consists of cobalt-60.

* * * * *